United States Patent
Tremlet et al.

(10) Patent No.: US 9,621,359 B2
(45) Date of Patent: Apr. 11, 2017

(54) SYSTEMS AND METHODS FOR AUTHENTICATION BASED ON PHYSICALLY UNCLONABLE FUNCTIONS

(71) Applicant: Maxim Integrated Products, Inc., San Jose, CA (US)

(72) Inventors: Christophe Tremlet, Aubagne (FR); Scott Edward Jones, Highland Village, TX (US)

(73) Assignee: Maxim Integrated Products, Inc., San Jose, CA (US)

(*) Notice: Subject to any disclaimer, the term of this patent is extended or adjusted under 35 U.S.C. 154(b) by 38 days.

(21) Appl. No.: 14/842,661

(22) Filed: Sep. 1, 2015

(65) Prior Publication Data
US 2017/0005811 A1    Jan. 5, 2017

(30) Foreign Application Priority Data

Jun. 30, 2015 (FR) ...................................... 15 56126

(51) Int. Cl.
H04L 29/06 (2006.01)
H04L 9/32 (2006.01)
H04L 9/30 (2006.01)

(52) U.S. Cl.
CPC .......... *H04L 9/3278* (2013.01); *H04L 9/3066* (2013.01); *H04L 9/3263* (2013.01); *H04L 63/0823* (2013.01)

(58) Field of Classification Search
CPC ... H04L 9/3278; H04L 9/3066; H04L 9/3263; H04L 63/0823
USPC ........................................................ 713/175
See application file for complete search history.

(56) References Cited

U.S. PATENT DOCUMENTS

| 2009/0083833 A1 | 3/2009 | Ziola et al. |
| 2013/0322617 A1* | 12/2013 | Orshansky ............ H04L 9/3278 380/28 |
| 2014/0126306 A1* | 5/2014 | Otterstedt ................ G11C 7/06 365/189.07 |
| 2015/0071432 A1* | 3/2015 | Zhu ...................... G11C 11/1673 380/28 |
| 2015/0074433 A1* | 3/2015 | Zhu .......................... G06F 1/26 713/300 |

(Continued)

FOREIGN PATENT DOCUMENTS

| WO | WO2006053304 A2 | 5/2006 |
| WO | WO2009024913 A2 | 2/2009 |

OTHER PUBLICATIONS

Search Report issued Jan. 21, 2016, in FR1556126 (16pgs).

(Continued)

*Primary Examiner* — Michael S McNally
(74) *Attorney, Agent, or Firm* — North Weber & Baugh LLP (57) ABSTRACT

Presented are systems, devices, and methods for reliably authenticating asymmetric cryptography-based ICs based on Physically Unclonable Functions (PUFs) that are immune to reverse engineering. Various embodiments of the invention enhance the level of security in IC architectures without the need to connect to a remote certification authority, thereby, eliminating shortfalls associated with online authentication. Certain embodiments accomplish this by using a PUF-generated secure private key that need never be output by or exported from the PUF.

20 Claims, 5 Drawing Sheets

(56) References Cited

U.S. PATENT DOCUMENTS

2016/0021096 A1* 1/2016 Wallrabenstein ... H04L 63/0853
    713/174
2016/0065378 A1* 3/2016 Kim ..................... H04L 9/0863
    713/184

OTHER PUBLICATIONS

Batina et al., "Public-key cryptography for RFID-tags," Proceedings of the Fifth Annual IEEE International Conference on Pervasive Computing and Communications Workshops. (PerComW'07), 0-7695-2788-4/07, 2007 (6pgs).

Guajardo et al., "Physical unclonable functions and public-key crypto FPGA IP protection," 1-4244-1060-6/07, 2007, IEEE (7pgs).

* cited by examiner

SYSTEMS AND METHODS FOR AUTHENTICATION BASED ON PHYSICALLY UNCLONABLE FUNCTIONS

CROSS-REFERENCE TO RELATED APPLICATIONS

The present application claims priority to French Application No. 1556126, filed on Jun. 30, 2015.

BACKGROUND

A. Technical Field

The present invention relates to authenticating electronic devices and, more particularly, to systems, devices, and methods of authenticating electronic devices by applying asymmetric cryptography schemes to Physically Unclonable Function (PUF)-based authentication ICs.

B. Background of the Invention

A traditional authentication IC is a device designed to securely hold a cryptographic key or secret in Non-Volatile Memory (NVM) or generate a secret via a PUF circuit that is integrated with the device. PUF design takes advantage of small but inevitable characteristic manufacturing variations in physical semiconductor components, including measurable variations in doping concentrations, gate oxide thickness, and tolerances in geometry that result from imperfect semiconductor manufacturing processes that electronic devices such as MOS devices undergo. These variations can be used to produce sequences of random, unique data values that can be used to generate cryptographic keys. A PUF circuit typically generates a random, device-unique but repeatable number that can be used to generate a unique response for verification purposes. The response unpredictably changes—hence the term unclonable—when the physical condition of the PUF circuit even slightly changes (e.g., due to minor physical damage) once the device containing the PUF circuit is probed or altered.

Two basic types of authentication ICs exist. A first type is based on symmetric cryptographic methods in which a unit authenticating a device, e.g., a host such as a printer, shares a secret with a device, e.g., a cartridge. The second type—the main subject of the present invention—is based on asymmetric cryptographic methods, wherein the entity authenticating a device uses a public key, and wherein the device uses a private key to prove its identity. While the public key may be freely disclosed, the private key must be strongly protected from disclosure.

Authentication ICs that store the secret in a NVM typically include some protection against reverse engineering. Nevertheless, common authentication ICs suffer from a significant shortfall, because given sufficient time, money, and expertise, adversaries can defeat existing protection mechanisms and retrieve even well-protected credentials such as private keys and clone devices, for example, by employing failure analysis techniques.

Since PUFs are known to provide the highest level of resistance against physical and invasive attack via reverse engineering, PUF-generated secrets are considered immune to these types of attacks. However, traditional authentication ICs that use PUF-generated secrets require the to-be-protected device carrying the IC be online such as to access the manufacturer's database to perform the authentication, which is neither always possible, nor convenient, nor secure.

Alternative approaches operate by generating a private key without using a PUF circuit or using a secret stored in non-volatile memory. However, such approaches are not immune to reverse engineering, at all, and can be bypassed by sophisticated attackers.

What is needed are systems and methods to overcome the abovementioned limitations.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In this document, the term "PUF" includes physical, chemical, and other PUF elements recognized by one of skilled in the art. Such PUFs may be used as a secure physical element as is determined by the hardware of a particular device.

Figure 1:
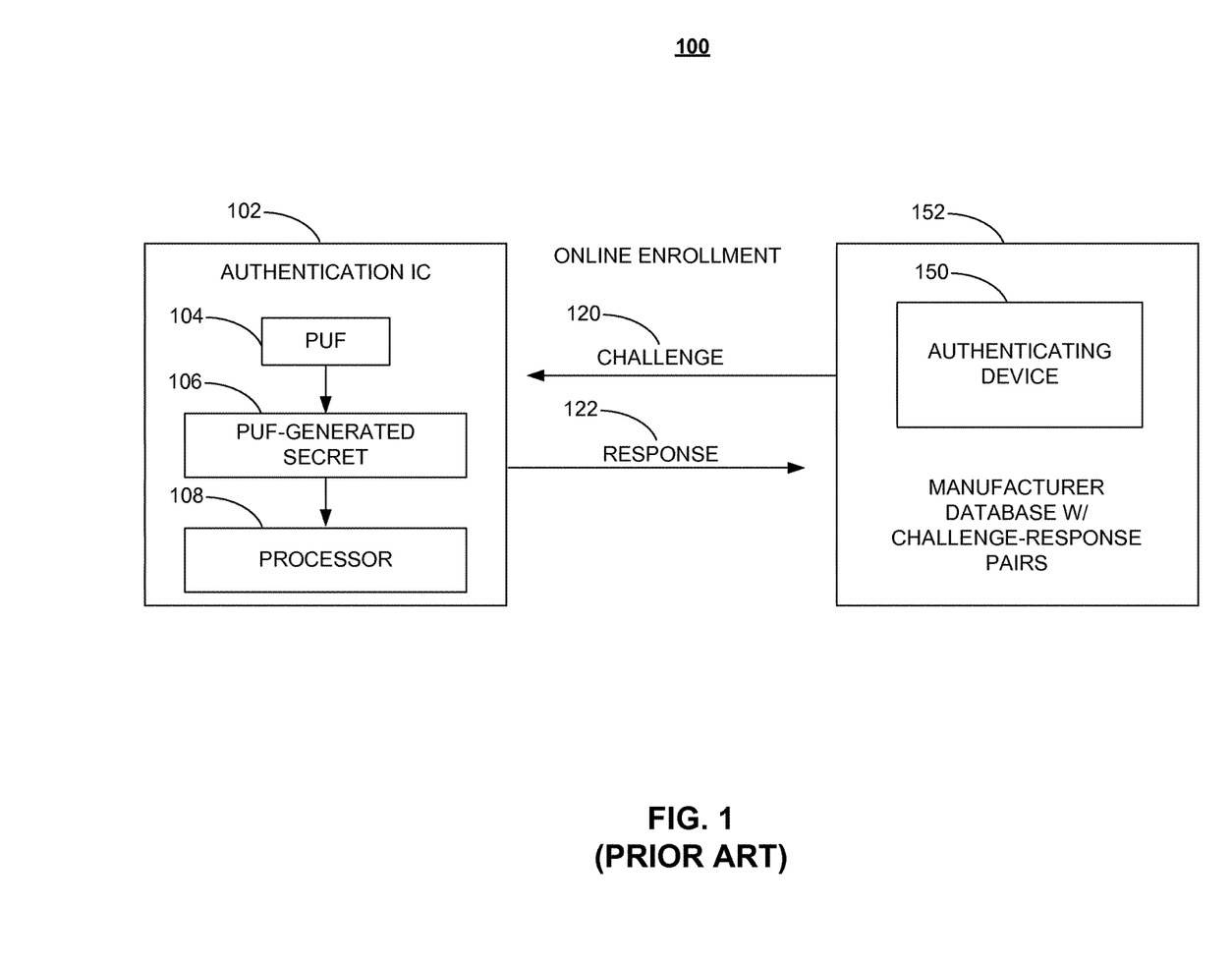
FIG. 1 shows a conventional PUF-based authentication IC requiring online authentication based on a manufacturer database.

FIG. 1 shows a conventional PUF-based authentication IC that requires online authentication by an authenticating device. Authentication IC 102 comprises PUF 104, PUF-generated secret 106, and processor 108. PUF 104 is a circuit that may be integrated in a to-be-authenticated device, such as a cell phone. Authenticating device 150 comprises manufacturer database 152. In this example, manufacturer database 152 contains a set of challenge-response pairs.

In operation, PUF 104 provides a means to protect authentication IC 102 against reverse engineering attempts by attackers. PUF 104 makes use of the physical conditions of a device to generate secret 106, such as a random number, that is unique to the device. The random number can be used to generate a corresponding response 122 that authenticating device 150 then may use to verify the authenticity of authentication IC 102. Challenge 120 is a public random number while response 122 is a computed answer provided by authentication IC 102. Processor 108 usually performs calculations and communicates with authenticating device 150.

During the manufacturing process of authentication IC 102, typically, a predefined set of challenge-response pairs is recorded in manufacturer database 152, which is a secure database that associates challenges 120 with PUF responses 122 for subsequent use in authentication processes. Typically, PUF 104 receives a large number of challenges 120 and provides corresponding responses 122 that are recorded in manufacturer database 152. The principles of challenge-response authentication are based on probing whether a secret, here, PUF-generated secret 106, is known without actually disclosing the secret. The details of challenge-response authentication are not discussed in greater detail herein.

In order to authenticate the device holding authentication IC 102 during field usage, authentication IC 102 is typically connected to database manufacturer 152 via a network, and a challenge-response pair is randomly chosen from database 152 to perform authentication. Challenge 120, which typically is a random number, is sent to authentication IC 102, which calculates and returns response 122 based on secret 106 and the random number. Response 122 is then compared to an expected response stored in database 152. Finally, if response 122 matches challenge 120 in database 152, authentication IC 102 is successfully authenticated. However, the need for online verification renders usage of existing PUF-based authentication ICs, such as authentication IC 102, impractical in certain contexts as well as vulnerable to attacks to database 152. Therefore, it would be desirable to have systems and methods in place that provide the highest level of tamper protection for authentication IC 102 and can be conveniently used even when the connection to database 152 is unavailable.

Figure 2:
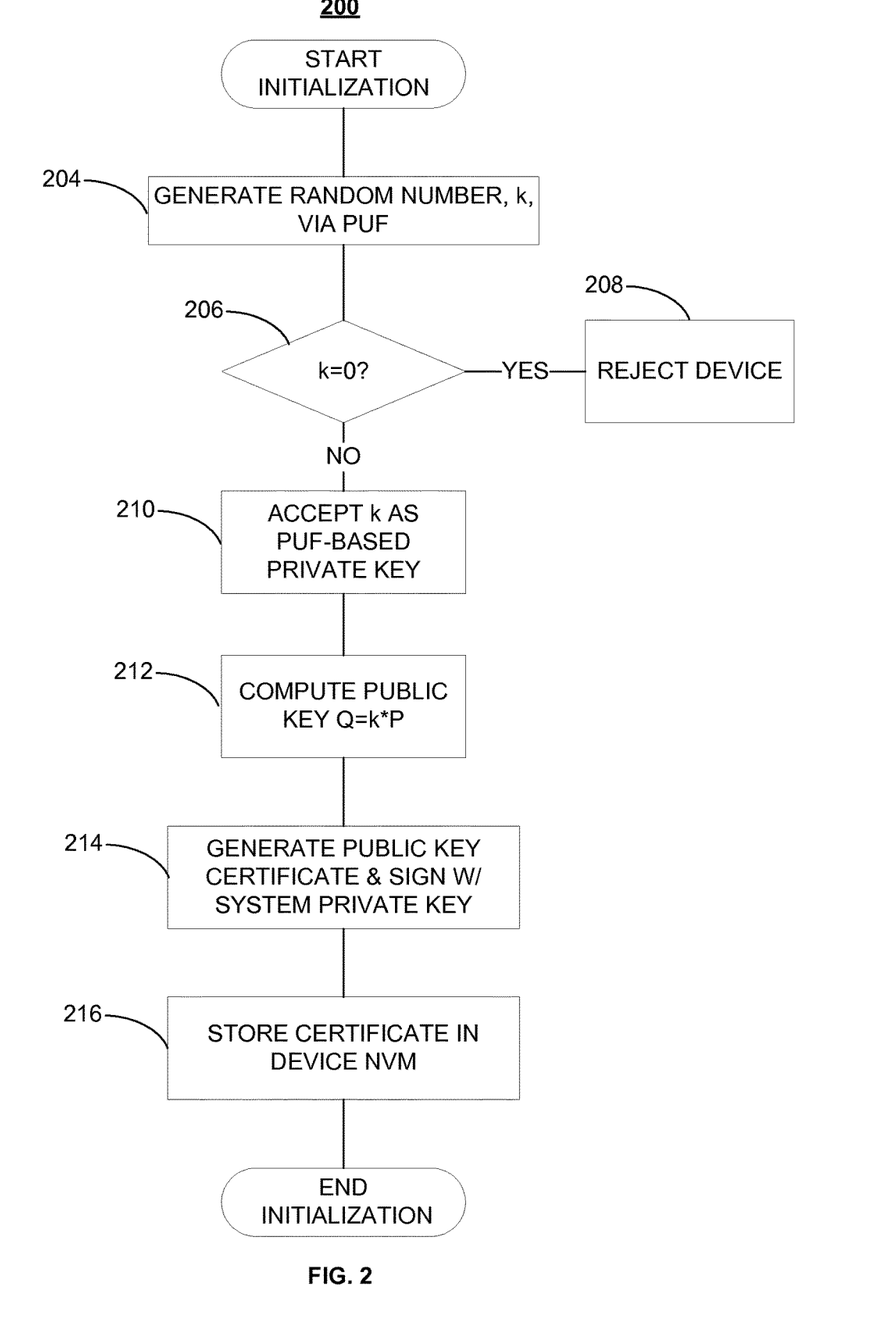
FIG. 2 is a flowchart of an illustrative initialization procedure for authenticating a device according to various embodiments of the invention.

FIG. 2 is a flowchart of an illustrative initialization procedure for authenticating a device, according to various embodiments of the invention. Initialization process 200, as it may be performed as part of a manufacturing process, begins at step 204, when a random number, k, is generated by a PUF element, for example, an on-board PUF circuit. In embodiments, the PUF-generated random number is not stored in a non-volatile memory.

At step 206, it is determined whether the value of the PUF-generated random number is equal to zero.

If so, then at step 208, the device comprising the authentication IC and PUF element is rejected as unacceptable.

If, on the other hand, the value of a random number, k, is not equal to zero, then, at step 210, k is accepted as PUF-based key, e.g., as a private key.

At step 212, the PUF-based key is used to compute an associated public key, Q. In embodiments, for an ECDSA cryptographic algorithm, the private and public key are linked by a mathematical property, here, by the equation Q=k*P. With P and Q being points of an elliptic curve over GF(p), a prime field of order p.

At step 214, a certificate that is associated with the public key is generated. In embodiments, once the authentication IC issues the public key, in order to ensure that the key is genuine and not issued by some unauthorized entity, the public key certificate is generated for Q, for example, by a certification authority during the manufacturing process (e.g., during production testing of the IC). The public key certificate may be a record that comprises data fields of a predetermined format. For example, one of the data fields may hold a value that is representative of the public key Q.

In embodiments, generation of the public key certificate in step 214 comprises signing the certificate with a system private key. The system private key may be a number that is generated external to the IC during device manufacturing. In one embodiment, the system private key is a certification authority private key.

Finally, at step 216, the signed public key certificate for Q may be stored in a non-volatile memory of the authentication IC.

Figure 3:
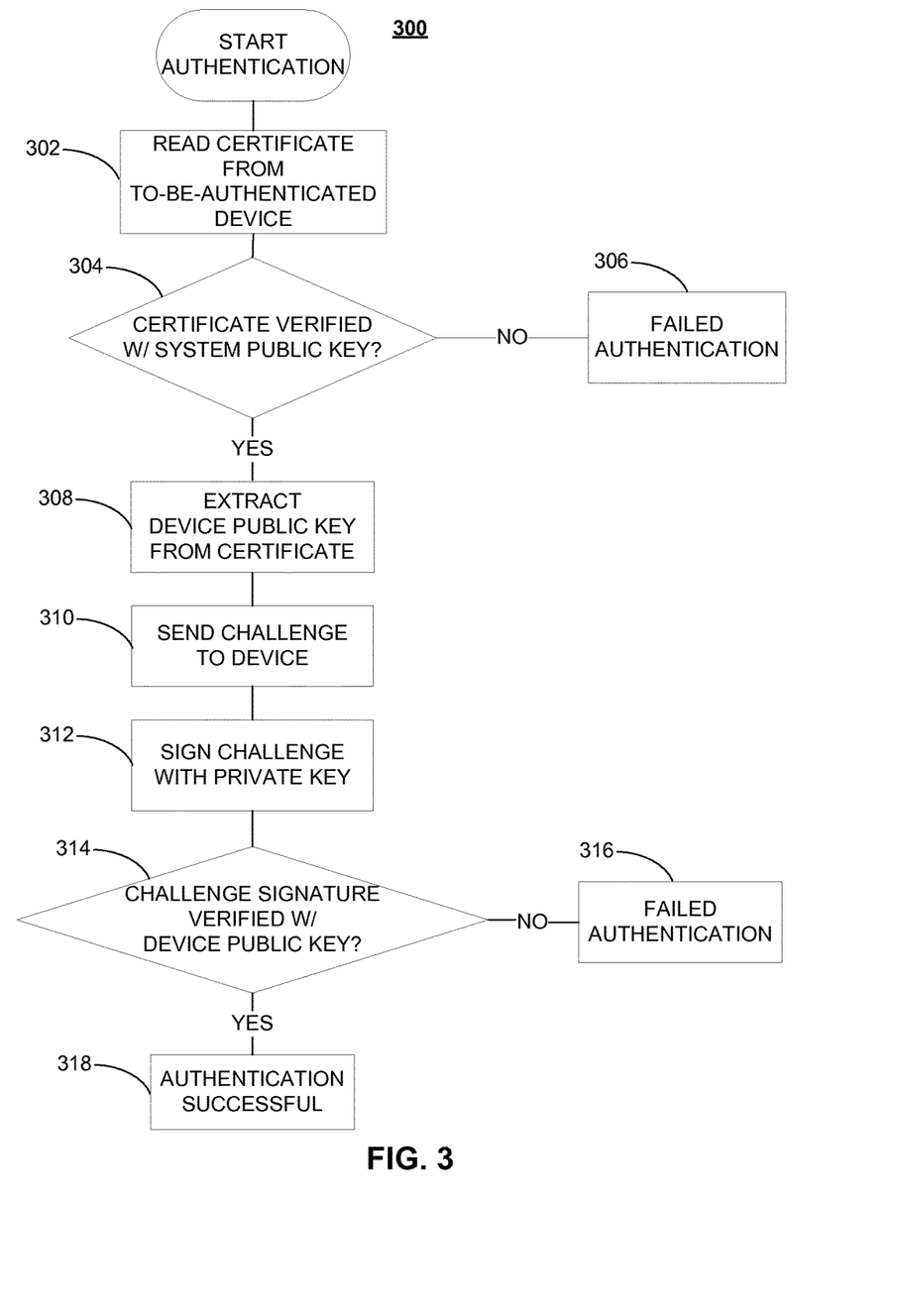
FIG. 3 is a flowchart of an illustrative process for authenticating a device via a host during field usage, according to various embodiments of the invention.

FIG. 3 is a flowchart of an illustrative process for authenticating a device via a host during field usage, according to various embodiments of the invention. Authentication procedure 300 begins at step 302, when a certificate from a to-be-authenticated device is read, for example, by a host that receives a system public key and stores it in memory.

At step 304, the host verifies the IC public key certificate with a system public key that is, for example, a public key of a certification authority that has previously been calculated.

If, at step 306, the IC public key certificate cannot be verified, then the verification attempt is considered to have failed.

At step 308, the host extracts or retrieves the IC device public key from the certificate.

Once the IC device public key is known, the host, at step 310, sends a challenge, such as a random number, to the authentication IC device.

At step 312, the authentication IC device signs the challenge with its PUF-issued private key.

At step 314, the host verifies the IC challenge signature with the IC device's public key, i.e., the host verifies the authenticity of the IC device.

If verification is successful, the device is successfully authenticated at step 318.

Otherwise, at step 316, device authentication is considered to have failed.

One of ordinary skill in the art will appreciate that the authentication IC that stores a secret may comprise a cryptographic engine to perform cryptographic calculations.

Figure 4:
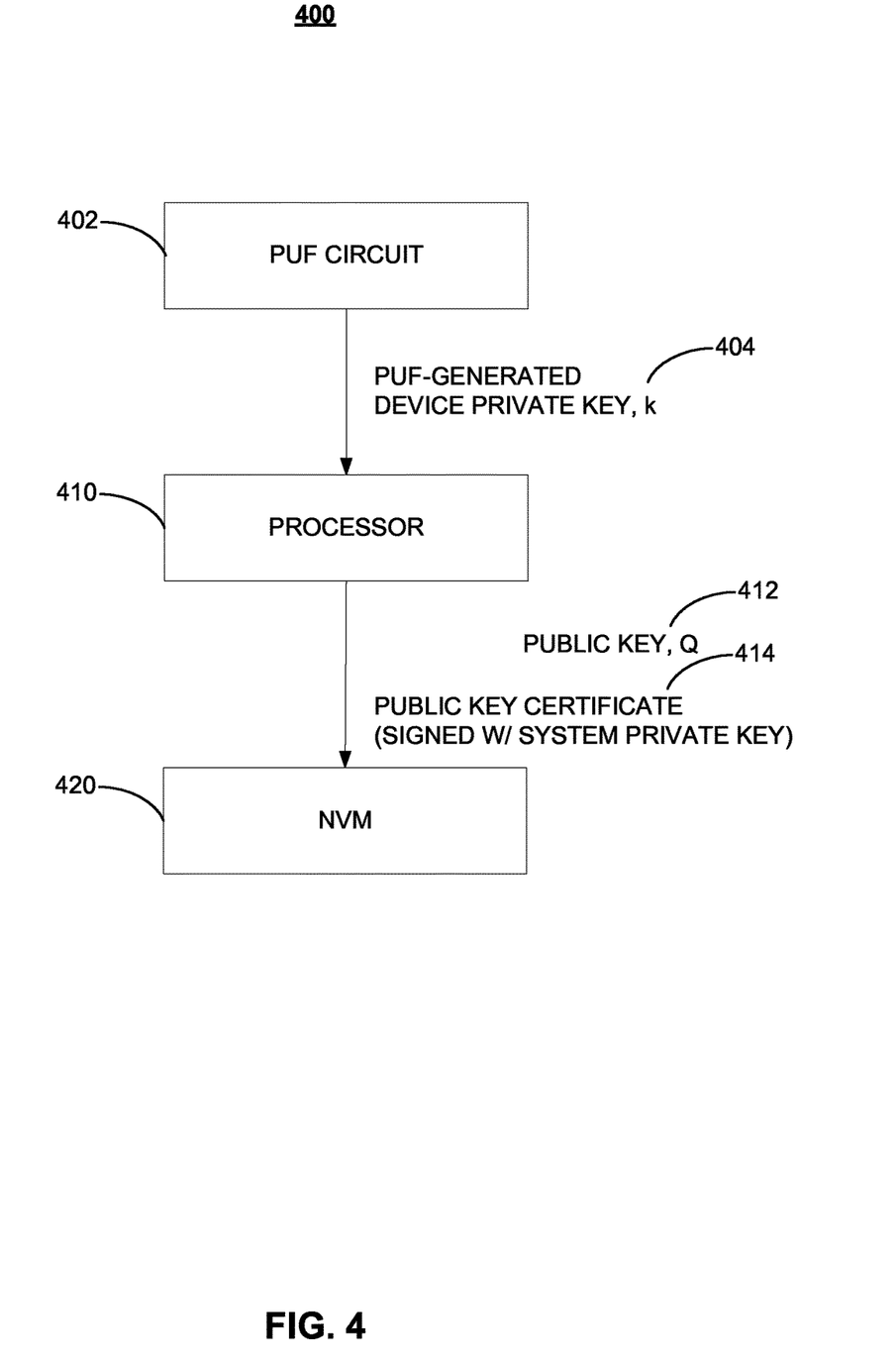
FIG. 4 illustrates an exemplary block diagram of a circuit for authenticating a device in accordance with various embodiments of the invention.

FIG. 4 illustrates an exemplary block diagram of an integrated circuit for authenticating a device in accordance with various embodiments of the invention. Circuit 400 comprises PUF element 402, processor 410, and nonvolatile memory 420. It is noted that any of processor 410 and nonvolatile memory 420 may be located external to integrated circuit 400.

In embodiments, PUF element 402 is a circuit that generates a random number, including during a manufacturing process. The number may be a unique, repeatable number, e.g., a 256 bit value, and may be used as a unique cryptographic secret key. Several PUF circuits may be used to generate multiple private keys.

In embodiments, based on the inherent property of asymmetric cryptographic algorithms, such as an Elliptic Curve Digital Signature Algorithm (ECDSA), the generated number must be a non-zero integer to produce a valid public key.

The PUF-generated random number is provided to processor 410 that first determines whether the number equals zero. If so, circuit 400 is rejected as unacceptable. The possibility of PUF element 402 generating a zero value that would result in the creation of an invalid public key is based on the inherent unpredictable nature of PUF elements. In embodiments, a nonzero random number is accepted or used to generate associated device private key 404.

It is noted that algorithms such as RSA do not lend themselves to be used with PUF elements since non-zero numbers alone do not guarantee validity of a random number. In fact, numbers used for private keys for RSA are subject to additional requirements, such as having the particular characteristic of being a prime number, etc.

In embodiments, device private key 404 is used to compute an associated public key, Q, by using the equation Q=k*P. In general, the equation Q=k*P defines a set of points that creates an elliptic curve. The scalar multiplication is a basic operation on points of the elliptic curve, which may be used to sign data. A point located on an elliptic curve is multiplied by a scalar typically by adding a point various times to itself to yield another point on the curve. However, by knowing resulting points alone, it is virtually impossible to determine the number of times the addition was performed to arrive at a resulting point, which makes elliptic point multiplication attractive for use in cryptography. The public key may be generated on-board by performing a scalar multiplication. In embodiments, the PUF-generated random number is not stored in non-volatile memory 420 that may or may not be external to integrated circuit 400.

In embodiments, once the circuit 400 issues device public key 412, in order to ensure that key 412 is genuine and not issued by some unauthorized entity, processor 410 generates public key certificate 414 for public key 412. It is noted that processor 410 may be remotely located and operated by an external entity, such as a tester. In embodiments, processor 410 generates a certificate that is based on a result from PUF 402 and is stored in non-volatile memory 420. The public key certificate may be a record that comprises data fields of a predetermined format. For example, one of the data fields may hold a value that is representative of the public key.

In embodiments, processor 410 externally signs the certificate with a system private key, e.g., a certification authority private key that is an externally generated number, for example, during a device manufacturing process, such as during production testing of circuit 400, thereby, preventing that the system private key is imported into the authentication device.

Figure 5:
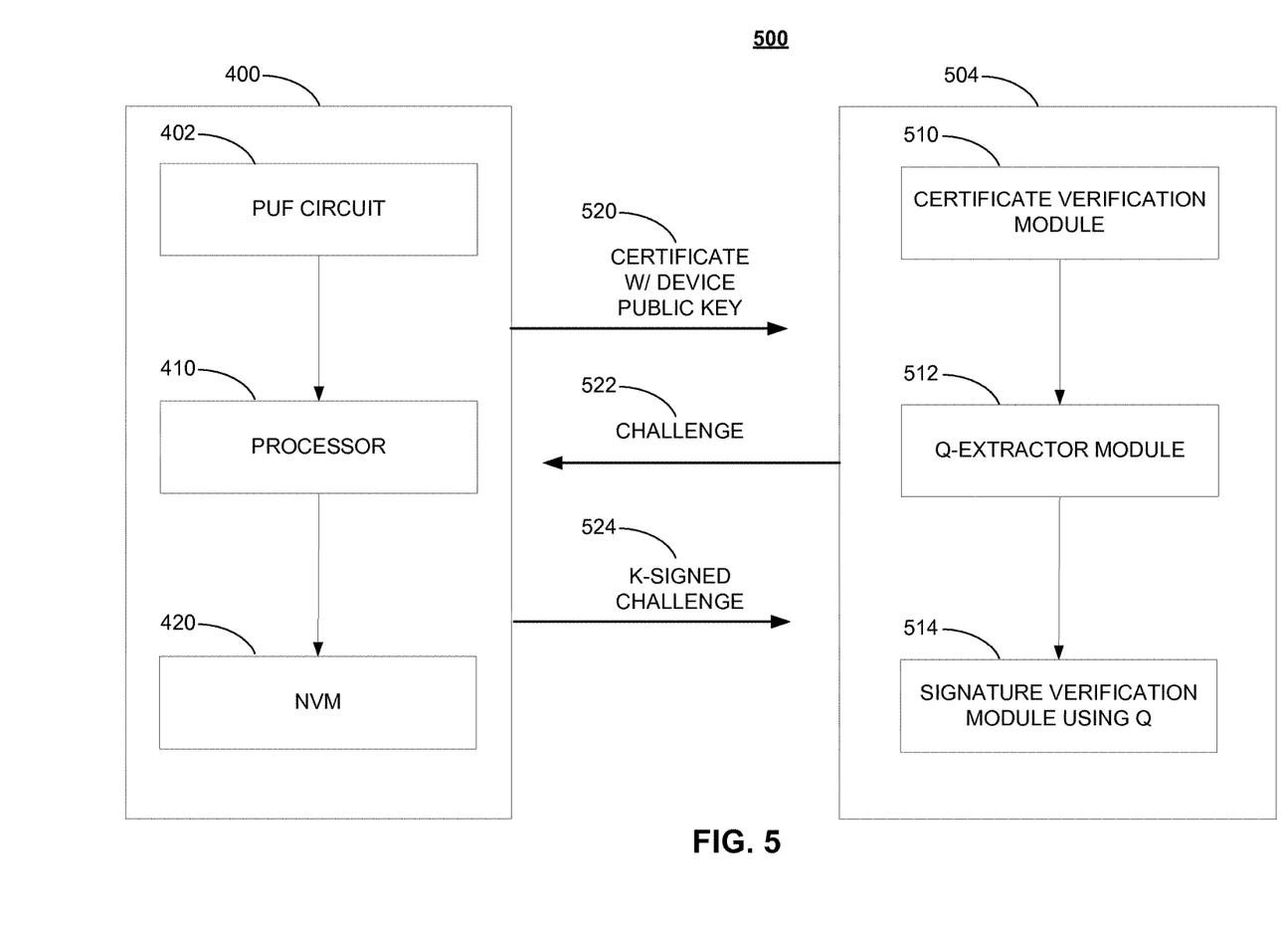
FIG. 5 illustrates an exemplary block diagram of a system for authenticating a device according to various embodiments of the invention.

FIG. 5 illustrates an exemplary block diagram of a system for authenticating a device according to various embodiments of the invention. For clarity, components similar to those shown in FIG. 4 are labeled in a similar manner. For purposes of brevity, a description or their function is not repeated here.

System 500 comprises, circuit 400 and host 504. Host 504, in turn, comprises, certification verification module 510, Q-extractor module 512, and signature verification module 514. It is noted that modules 510-514 may be implemented as standalone units or integrated into a single unit. In embodiments, circuit 400 is embedded into a to-be-authenticated device to good, such as an electronic device, that communicates via appropriate communication interfaces (not shown).

In operation, in a manner similar to FIG. 4, circuit 400 outputs a certificate that comprises a device public key. In embodiments, during field usage, host 504 reads public key certificate 520 via certificate verification module 510. Public key certificate 520 comprises a device public key, for example, a public key of a certification authority that has previously been calculated. Certificate verification module 510 either verifies certificate 520 or rejects circuit 400 as failed.

In embodiments, Q-extractor module 512 extracts or retrieves the device public key from certificate 520. In response, host 504 sends challenge 522 (e.g., a random number) to circuit 400 to be signed with a private key generated by PUF circuit 402. Upon receipt of response 524 from circuit 400 to challenge 522, host 504 verifies signed challenge 524 with the public key of circuit 400 to authenticate circuit 400 or any device carrying circuit 400.

In embodiments, at least one of circuit 400 and host 504 comprises a cryptographic engine that performs cryptographic calculations.

It is understood that other asymmetric cryptography schemes may equally applied to authenticate circuit 400.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

What is claimed is:

1. An integrated circuit for authenticating an electronic device without connecting to a remote certification authority, the integrated circuit comprising:
   a physically unclonable function (PUF) element that generates a random number; and
   a processor configured to:
   receive the random number and determine whether the random number is non-zero;
   in response to determining that the random number is non-zero, accept a device private key that is based on the random number;
   compute a device public key associated with the random number;
   receive during a manufacturing process a public key certificate that is based on a computed public key, the public key certificate being signed with an external private key;
   receive a challenge from a host;
   sign the challenge with the device private key; and
   communicate the signed challenge to the host.

2. The integrated circuit according to claim 1, wherein the challenge is a random number that is not stored in a nonvolatile memory.

3. The integrated circuit according to claim 1, wherein the public key certificate comprises a data field comprising a value that is representative of the device public key.

4. The integrated circuit according to claim 1, wherein the external private key is provided by an external certification authority.

5. The integrated circuit according to claim 1, wherein the processor is external to the integrated circuit.

6. The integrated circuit according to claim 1, wherein the signed public key certificate is stored in a nonvolatile memory.

7. The integrated circuit according to claim 6, wherein the nonvolatile memory is external to the integrated circuit.

8. A method for authenticating an electronic device without connecting to a remote certification authority, the method comprising:
   a physically unclonable function (PUF) element that generates a random number; and
   a processor configured to:
   receive the random number and determine whether the random number is non-zero;
   in response to determining that the random number is non-zero, accept a device private key that is based on the random number;
   compute a device public key associated with the random number;
   receive during a manufacturing process a public key certificate that is based on a computed public key, the public key certificate being signed with an external private key;
   receive a challenge from a host;
   sign the challenge with the device private key; and
   communicate the signed challenge to the host.

9. The method according to claim 8, wherein generating the random number is performed during a manufacturing process.

10. The method according to claim 8, wherein computing the device public key comprises performing an elliptic curve multiplication.

11. The method according to claim 8, further comprising, in response to determining that the random number equals zero, rejecting the electronic device.

12. The method according to claim 8, further comprising receiving the external private key from an external certification authority.

13. A system for authenticating an electronic device without connecting to a remote certification authority, the system comprising:
    a non-volatile memory to store a public key certificate;
    a circuit comprising a physically unclonable function (PUF) element that generates a random number; and
    a processor configured to:
    use the random number as a device private key in response to determining whether the random number is non-zero;
    compute the device public key associated with the random number; and
    receive the public key certificate associated with the random number; and sign the public key certificate with an external private key; and
    communicate the signed challenge to a host to enable the host to authenticate the electronic device.

14. The system according to claim 13, wherein authentication comprises verifying the signed challenge with the device public key to validate a physical condition of the electronic device comprising the PUF.

15. The system according to claim 13, wherein the signed public key certificate is stored in the nonvolatile memory.

16. The system according to claim 15, wherein the host reads the public key certificate, from the nonvolatile memory.

17. The system according to claim 13, further comprising an external certification authority that provides the external private key.

18. The system according to claim 13, further comprising a certification authority that pre-calculates a system public key.

19. The system according to claim 17, wherein the host verifies the public key certificate with the system public key.

20. The system according to claim 13, further comprising a cryptographic engine designed to perform an elliptic curve point multiplication.

* * * * *